Figure 1:
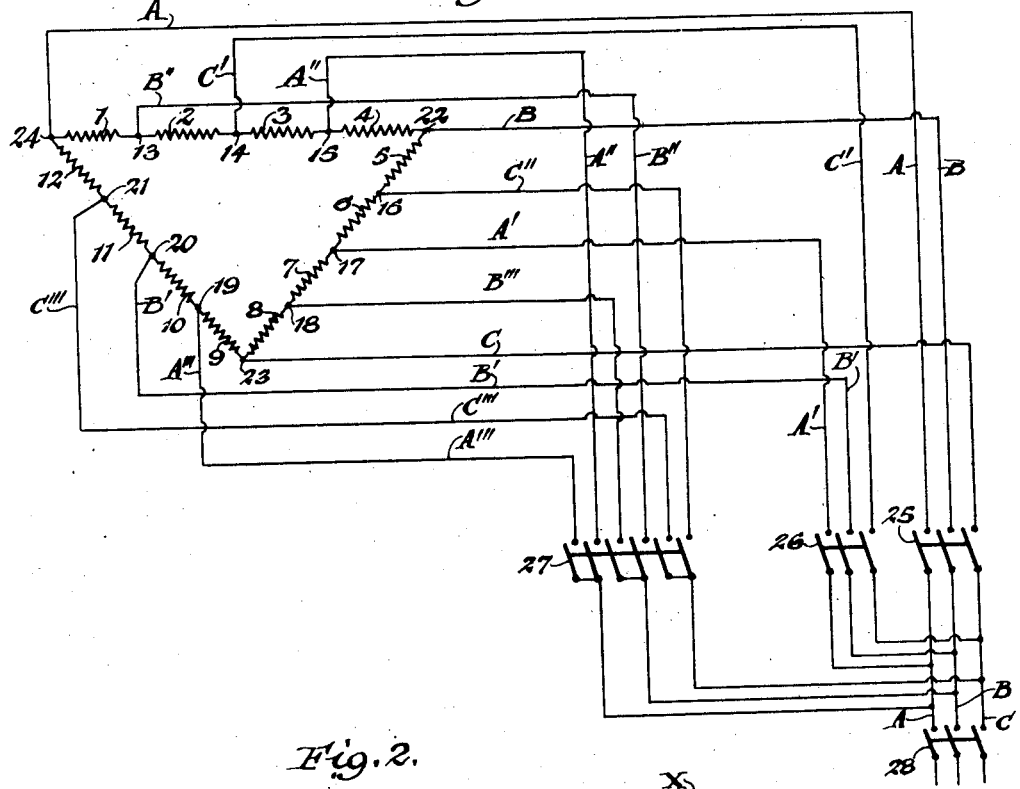

Jan. 22, 1935.   J. E. JEWETT   1,988,845
ELECTRICAL HEATING
Filed Jan. 31, 1930

Inventor
Joseph E. Jewett
by
Attorney

Patented Jan. 22, 1935

1,988,845

UNITED STATES PATENT OFFICE 1,988,845

ELECTRICAL HEATING

Joseph E. Jewett, Buffalo, N. Y., assignor to National Aniline and Chemical Company, Inc., New York, N. Y., a corporation of New York Application January 31, 1930, Serial No. 424,915

7 Claims. (Cl. 219—20)

This invention relates to electrical heating, and more particularly to an improved apparatus whereby a varied heat output may be obtained from an electrical resistance heater connected to a polyphase alternating current electrical circuit.

It has heretofore been proposed to vary the heat output of an electrical resistance heater connected to a three-phase alternating current electrical circuit by connecting the resistance elements of an electrical heater to a three-phase alternating current electrical circuit by a Y-series connection; that is, by connecting three resistance elements by a Y-connection, which can be changed by suitable switches to a series connection on one phase. This arrangement has the disadvantages that it is univariant in that only either one-third or full heat can be obtained, and that when connected in series the full load is on only one phase, which unbalances the circuit.

It has also been proposed to connect three resistance elements to a three-phase alternating current electrical circuit by a delta-series connection; that is, by a delta-connection which can be changed by suitable switches to a series connection on one phase. This arrangement also has the disadvantages that it is univariant, in that only either one-ninth or full heat can be obtained, and that when connected in series the full load is on only one phase, which unbalances the circuit.

It has furthermore been proposed to connect three resistance elements to the phases of a three-phase electrical circuit by a delta connection, which can be changed by suitable switches to a Y-connection. This method maintains the load substantially balanced among the three phases, but is objectionable because it permits the obtainment of only either one-third or full heat.

An object of the invention is to provide a means for varying by a plurality of stages the heat produced by an electrical resistance heater connected to a polyphase alternating current electrical circuit while maintaining a substantially balanced load on the various phases.

Another object of the invention is to provide a means for varying by a plurality of stages the amount of heat produced by a multiple element electrical resistance heater connected to a three-phase alternating current electrical circuit while maintaining all of the resistance elements in the circuit and an equal load on each phase.

Another object of the invention is to provide a means for obtaining substantially one-quarter, one-half, and full heat from an electrical resistance heater connected to a three-phase alternating current electrical circuit while maintaining a substantially equal load on each phase.

A further object of the invention is to provide a means for connecting a plurality of electrical resistance heating elements to a three-phase alternating current electrical circuit so that by the manipulation of suitable switches a plurality of degrees of heat may be obtained while maintaining an equal load on each phase, and so that the said switches may be opened or closed in any order and in any combination of two or more without endangering the apparatus or causing a short circuit.

With the above mentioned ends in view, the invention comprises the novel features of construction, combination of elements, and arrangement of parts exemplified in the following detailed disclosure and illustrated in the accompanying drawing. The scope of the invention will be indicated in the claims.

According to the present invention, the objects thereof are accomplished by providing an apparatus in which there is a separate heating unit for each phase of a three-phase alternating current electrical circuit employing one or more pairs of resistance elements connected in series. Each heating unit is connected to all three conductors of the three-phase circuit, and means is provided for applying the full phase voltage across all of the resistance elements of the unit in series, across each pair of resistance elements in series, across each of the resistance elements individually, or across some of the resistance elements of the unit in series and some of the resistance elements individually. Additional means is provided for connecting only a part of the resistance elements of each unit to the circuit.

Figure 2:
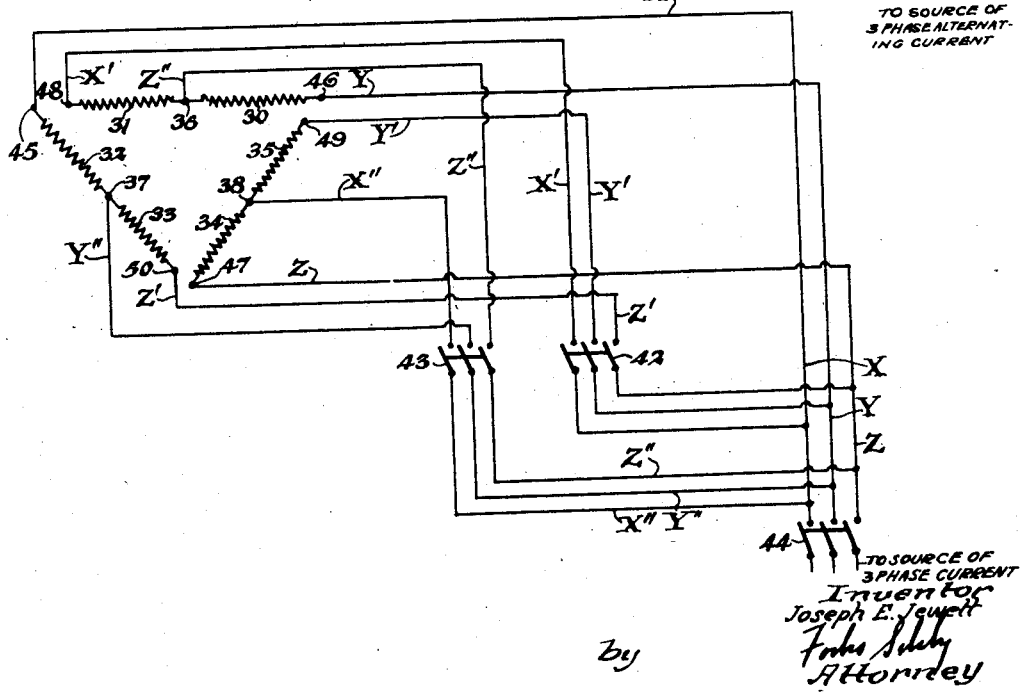

For a fuller understanding of the nature and objects of the invention, reference should be had to the following detailed description taken in connection with the accompanying drawing in which Figure 1 is a diagrammatic representation of an electrical circuit embodying the invention; and Figure 2 is a diagrammatic representation of an electrical circuit embodying a modification of the invention.

Referring to Figure 1 of the drawing which is a diagrammatic representation of the electrical connections and the arrangement of the resistance elements of an electrical heater, 1, 2, 3, 4, 5, 6, 7, 8, 9, 10, 11 and 12 represent electrical resistance heating elements delta-connected, in groups of four, to a three-phase alternating current electrical circuit having the feeders A, B and C. Resistance elements 1 and 2 are connected in series at 13, elements 2 and 3 are connected in series at 14, and elements 3 and 4 are connected in series at 15, forming a unit 1—2—3—4; resistance elements 5, 6, 7 and 8 are similarly connected in series at 16, 17 and 18, forming a second unit 5—6—7—8; and resistance elements 9, 10, 11 and 12 are similarly connected in series at 19, 20 and 21, forming a third unit 9—10—11—12. Units 1—2—3—4, 5—6—7—8, and 9—10—11—12 are connected at points 22, 23 and 24 to form a delta. For the purpose of distributing the load equally among all the phases, all of the resistance elements 1 to 12 are of substantially the same resistance.

Feeder A of the main three-phase electrical circuit is connected to the delta at junction 24, feeder B is connected to the delta at junction 22, and feeder C is connected to the delta at junction 23.

Junction 17 of the resistance elements 6 and 7 is connected to a branch A' of feeder A, junction 20 of elements 10 and 11 is connected to a branch B' of feeder B, and junction 14 of elements 2 and 3 is connected to a branch C' of feeder C. This effects a division of the units into sub-units 1—2, 3—4, 5—6, 7—8, 9—10, and 11—12. Furthermore, it results in the connection of each unit to the three feeders A, B and C, of the three-phase circuit; two feeders being respectively connected to the two ends of the unit, and the third feeder being connected at the junction of the sub-units.

In a similar manner, junctions 15, 13 and 16 are connected through branches A", B" and C" respectively, to the feeders A, B and C; and junctions 19, 18 and 21 are connected through branches A''', B''' and C''', respectively, to feeders A, B and C. This results in the connection of each sub-unit to the three feeders A, B and C of the three-phase circuit, and also effects a further division of each sub-unit into two parts.

Suitable switching means serve to cut out the feeders and branches from the source of current; the same being shown as three-pole, single throw switches 25 and 26, which cut out the feeders A, B and C, and A', B' and C', respectively, and a six-pole, single-throw switch 27 which cuts out the branches A", B" and C", and A''', B''' and C''' from the branch circuit A" B" C". Branches A", B" and C", and A''', B''' and C''' are connected through switch 27, inasmuch as they are in effect, parts of the same branch circuit. An additional switch 28 cuts out the entire apparatus from the source of current.

It will be readily apparent that since each of the units 1—2—3—4, 5—6—7—8, and 9—10—11—12 is respectively connected at its ends to one phase of the three-phase alternating current electrical circuit A B C, the full phase voltage is applied across each unit when the switches 25 and 28 are closed and switches 26 and 27 are open. It will be furthermore be evident that a similar effect is produced when switches 26 and 28 are closed, and 25 and 27 are open; in which case the junctions 17, 20 and 14 serve as the points of connection to the circuit A B C.

In addition, by reason of the connection of the branches A', B' and C' to the junctions 17, 20 and 14, and the connection of the units 1—2—3—4, 5—6—7—8, and 9—10—11—12 to the feeders A, B and C, it is possible, by closing the switches 25, 26 and 28, to apply the full phase voltage to all of the elements 1 to 12 in pairs in series; that is, to sub-units 1—2, 3—4, 5—6, 7—8, 9—10, and 11—12. And, alternately by reason of the connection of the branches A", B", C", A''', B''' and C''' to the junctions 15, 13, 16, 19, 18 and 21, respectively, it is also possible by closing only switches 27 and 28 to apply the full phase voltage to sub-units of other pairs of elements in series; namely 2—3, 4—5, 6—7, 8—9, 10—11, and 12—1.

Furthermore, by reason of the connections of the elements to the feeders A B and C and to the branches A', B', C', A", B", C", A''', B''', and C''', it becomes possible, by closing all of the switches 25, 26, 27 and 28 to apply the full phase voltage to each of the elements 1 to 12; so that each element itself acts as an individual heating unit.

It accordingly follows that varying degrees of heat may be obtained from the heating elements 1 to 12, while maintaining an equal load on each of the three phases by manipulation of the switches in the proper combinations. Thus, when switches 25 and 28 alone are closed, or when switches 26 and 28 alone are closed, one-sixteenth of the total available heating capacity of the device is utilized; inasmuch as the full phase voltage is applied to each unit of four elements in series. When switches 25, 26 and 28 are closed, and switch 27 is open or when switches 27 and 28 alone are closed, one-fourth of the available heating capacity of the device is utilized; inasmuch as the full phase voltage is applied to each sub-unit of two elements in series. When switches 25, 27 and 28 are closed and 26 is open, five-eights of the total available heating capacity of the device is utilized; inasmuch as the full phase voltage is applied to each of the elements 1, 4, 5, 8, 9 and 12, and the full phase voltage is additionally applied to the sub-units 2—3, 6—7, and 10—11. In this connection, the elements 1, 4, 5, 8, 9 and 12 operate at full power, and the elements 2, 3, 6, 7, 10 and 11 operate at one-fourth power. In a similar manner, five-eighths of the total available heating capacity of the device may be utilized by closing switches 26, 27 and 28 and leaving switch 25 open. When all of the switches 25, 26, 27 and 28 are closed, the full heating capacity of the device is utilized; inasmuch as the full phase voltage is applied to each of the elements 1 to 12.

In the modification of the invention shown in Figure 2 of the drawing, electrical resistance heating elements 30 and 31 are connected in series at 36, elements 32 and 33 are connected in series at 37, and elements 34 and 35 are connected in series at 38; thereby forming units 30—31, 32—33, and 34—35. Element 32 is connected at its free end 45 to the feeder X of the three-phase alternating current electrical circuit X Y Z, element 30 is connected at its free end 46 to the feeder Y, and element 34 is connected at its free end 47 to the feeder Z. Elements 31, 35 and 33 are connected at their respective free ends 48, 49 and 50 to the feeders X, Y and Z through branches X', Y' and Z'. Junctions 38, 37 and 36, of the pairs of elements 34—35, 32—33 and 30—31, respectively, are also connected through their respective branches X", Y" and Z" to the feeders X, Y and Z. Suitable switching means, shown as three-pole, single-throw switches 42 and 43, serve to cut out the branch circuits X' Y' Z' and X" Y" Z", respectively, from the circuit X Y Z. A three-pole, single-throw switch 44 cuts out the whole device from the source of current. For maintaining an equal load on each phase, all of the elements 30 to 35 are also substantially of the same resistance.

As in the case of the modification of the invention described in connection with Figure 1, various degrees of heat, which vary by a plurality of stages, may be obtained by suitable manipulation of the switches 42 and 43, while yet maintaining a load which is substantially balanced among the phases. Thus, when switches 42 and 44 are closed and switch 43 is open, one-fourth of the available heating capacity of the device is obtained, inasmuch as the full phase voltage is applied across the series-connected pairs of elements, or units, 30—31, 32—33, and 34—35. And when all of the switches 42, 43 and 44 are closed, the full available heating capacity of the device is utilized; inasmuch as the full phase voltage is applied to each of the elements 30 to 35.

In the case of the modification of the invention shown in Figure 2, however, utilization of half of the available heating capacity of the device is obtained by cutting out one of the elements from each pair or unit. Thus, by closing switch 43 and leaving switch 42 open, (switch 44, of course, being closed) the full phase voltage is applied to each of the elements 30, 32 and 34, while elements 31, 33 and 35 remain inactive.

It will be noted that as a result of the invention the load on each phase is always the same as the load on every other phase; that the maximum power which can be applied to the device is applied when all of the switches are closed; and that closing less than all of the switches in any combination results only in an application of less than the total amount of power, and does not cause an unbalancing of the load, or damage to the apparatus through a short circuit. Moreover, by means of the embodiment of the invention illustrated in Figure 2, it is possible to obtain substantially one-quarter, one-half, and full heat from an electrical resistance heater connected to a three-phase alternating current electrical circuit, while maintaining a substantially equal load on each phase.

It will be realized that the invention is not limited to the apparatus and the details thereof which are set forth in the foregoing description. Thus one or more, and in fact all, of the resistance elements of the heater may be replaced by a group of resistance elements, connected in parallel or in series, without thereby affecting the principle of the invention. By increasing the number of elements and of branches to the feeder circuit, and by providing additional multi-pole switches, additional variations may be obtained of the utilization of the available heating capacity. Single pole switches may be employed for cutting out the branches instead of the multi-pole switches described; but for ease in manipulation multi-pole switches are preferred.

It will furthermore be realized that the invention is not limited to the control of power in an electrical heater but may be applied to other electrical apparatus where a similar control of power is desired.

Since certain changes in the construction, combination and arrangement of the parts set forth may be made without departing from the scope of the invention, it is intended that all matter contained in the above description and shown in the accompanying drawing shall be interpreted as illustrative, and not in a limiting sense, except as limited by the claims.

I claim:

1. An electrical circuit which comprises three electrical resistance units, each of said units comprising a pair of electrical resistance elements connected in series; and means for applying the full phase voltage of a three-phase alternating electrical circuit across each element of each unit or across only one element of each unit or across each unit, said means comprising a plurality of feeders each of which respectively electrically connects one end of each unit with a conductor of a main three-phase alternating current electrical circuit; a branch circuit comprising a plurality of feeders, each of which respectively electrically connects the other end of each unit with a conductor of said main circuit different from that to which the first mentioned end is connected, and a plurality of switches for cutting out said feeders from said main circuit, and a branch circuit comprising a plurality of feeders, each of which respectively electrically connects each unit at the junction of the elements forming said unit to the conductor of said main circuit to which the ends of said unit are not electrically connected, and a plurality of switches for cutting out said feeders from said main circuit.

2. An electrical heating apparatus which comprises three electrical resistance heating units, each of said units comprising a pair of electrical resistance elements connected in series; and means for applying the full phase voltage of a three-phase alternating electrical circuit across each element of each unit or across only one element of each unit or across each unit, said means comprising three conductors of a main three-phase alternating current electrical circuit, each of which is respectively electrically connected to one end of each unit; a branch circuit comprising three feeders, each of which respectively electrically connects the other end of each unit with a conductor of said circuit different from that to which the first mentioned end is connected, and a three-pole switch for cutting out said feeders from said main circuit; and a branch circuit comprising three feeders, each of which respectively electrically connects each unit at the junction of the elements forming said unit to the conductor of said main circuit to which the ends of said unit are not electrically connected, and a three-pole switch for cutting out said feeders from said main circuit.

3. An electrical circuit comprising a source of three phase alternating current including three conductors, three separate groups of resistance elements, the elements of each group being connected in series, a member connecting said groups of elements in series whereby each pair of successive resistance elements constitutes a unit of two resistance elements having a junction between them, an electrical connection between each junction and one of said conductors whereby each unit is connected at each end and at its junction with a different conductor, said member being included in circuit with the connections between said units and said conductors and being movable to disconnect one connection between each group and said conductors whereby an element of each group is rendered idle while the full phase voltage is applied across another element of each group.

4. An electrical circuit comprising a source of three-phase alternating current including three conductors, three groups of more than two resistance elements all connected in series whereby each pair of adjacent resistance elements constitutes a unit of two resistance elements having a junction between them, an electrical connection between each junction and one of said conductors whereby each unit is connected at each end and at its junction with a different conductor, and means for varying the heating effect of said apparatus including means for applying the full phase voltage across each element or across each unit or across each group or both across one unit and across at least one additional element.

5. An electrical circuit comprising a source of three-phase alternating current including three conductors, three groups of four resistance elements all connected in series whereby each pair of adjacent resistance elements constitutes a unit of two resistance elements having a junction between them, an electrical connection between each junction and one of said conductors whereby each unit is connected at each end and at its junction with a different conductor, and means for varying the heating effect of said apparatus, including a plurality of switches for applying the full phase voltage across each element or across each unit or across each group or both across one unit and across at least one additional element.

6. An electrical circuit comprising a source of three-phase alternating current including three conductors, three groups of four resistance elements all connected in series whereby each pair of adjacent resistance elements constitutes a unit of two resistance elements having a junction between them, an electrical connection including a switch between each junction and one of said conductors whereby each unit is connected at each end and at its junction with a different conductor, and means for varying the heating effect of said apparatus, including means for moving said switches in groups so as to apply the full phase voltage across each element of each unit or across each unit or across each group or both across one unit and across at least one additional element.

7. An electrical heating apparatus comprising a source of three-phase alternating current including three conductors, three separate groups of resistance elements each of which groups consists of two resistance elements connected in series, means including a contactor movable to connect said groups of elements in series so that each pair of successive resistance elements constitutes a unit of two resistance elements having a junction between them, and an electrical connection between each junction and one of said conductors whereby each unit is connected at each end and at its junction with a different conductor, said contactor being included in circuit with the connections between said units and said conductors and being movable to disconnect one connection between each group and said conductors and thereby render one element of each group idle while the full-phase voltage is applied across the other element of each group.

JOSEPH E. JEWETT.